(12) United States Patent
Chen et al.

(10) Patent No.: US 8,536,329 B2
(45) Date of Patent: Sep. 17, 2013

(54) REACTIVE DYE

(75) Inventors: Chien-Yu Chen, Taoyuan (TW);
Chen-Lung Kao, Taoyuan (TW);
Ya-Ching Yu, Taoyuan (TW);
Huei-Chin Huang, Taoyuan (TW)

(73) Assignee: Everlight USA, Inc., Pineville, NC (US)

( * ) Notice: Subject to any disclaimer, the term of this patent is extended or adjusted under 35 U.S.C. 154(b) by 4 days.

(21) Appl. No.: 13/439,974

(22) Filed: Apr. 5, 2012

(65) Prior Publication Data

US 2012/0264922 A1     Oct. 18, 2012

(30) Foreign Application Priority Data

Apr. 12, 2011 (TW) .............................. 100112601 A

(51) Int. Cl.
*C07D 403/04* (2006.01)

(52) U.S. Cl.
USPC ....................................................... 544/212

(58) Field of Classification Search
USPC ....................................................... 544/212
See application file for complete search history.

(56) References Cited

U.S. PATENT DOCUMENTS

| | | | | |
|---|---|---|---|---|
| 2,945,022 | A | * | 7/1960 | Fasciati et al. ................. 534/797 |
| 3,050,515 | A | * | 8/1962 | Gunst ............................ 534/655 |
| 3,950,128 | A | * | 4/1976 | Gregory ............................ 8/641 |

FOREIGN PATENT DOCUMENTS

GB          977814      * 12/1964

OTHER PUBLICATIONS

Schell et al., Chemical Abstracts, 112:32989, 1990, Registry No. 124520-73-6.*

* cited by examiner

*Primary Examiner* — Shawquia Young
(74) *Attorney, Agent, or Firm* — Turocy & Watson, LLP

(57) ABSTRACT

A reactive dye is disclosed. The reactive dye has the structure of formula (I):

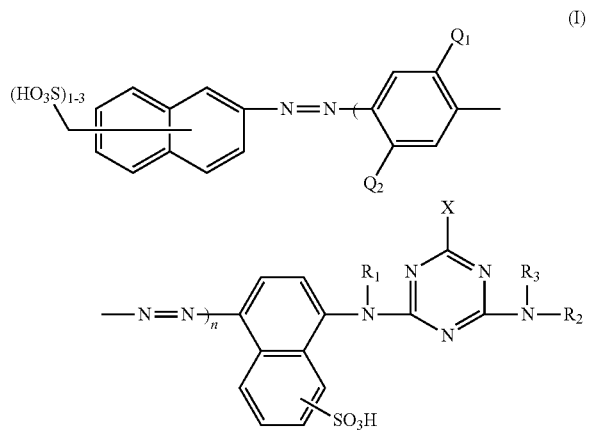

wherein X, $R_1$, $R_2$, $R_3$, n, $Q_1$, $Q_2$ and $(HO_3S)_{1-3}$ are defined in the specification. The reactive dye of the present invention has great build-up property, reproducibility and fastness.

9 Claims, No Drawings

REACTIVE DYE

FIELD OF INVENTION

The present invention relates to novel reactive dyes, and more particularly, to a novel reactive dye for a fiber having hydroxyl groups or amino groups in exhausting dyeing, cold pad batch dyeing, continuous dyeing, printing and digital printing.

BACKGROUND OF THE INVENTION

The current fashion color is earth-tone color such as brown, grey, khaki, olive and beige. The fabrics with earth-tone color are formed from dyeing fabrics with vat dyestuffs and have good reproducibility and fastness. However, the dyeing procedure is complicated, no bright color is formed in such dyeing procedure, and the build-up property is poor. Therefore, there is a need to develop a new dye to improve vat dyestuffs.

In addition, WO2008/055805 discloses a reactive dye mixture. However, there is a need to develop single yellow or red brown reactive dyes having great reproducibility and fastness.

SUMMARY OF THE INVENTION

The present invention provides a reactive dye having the structure of formula (I):

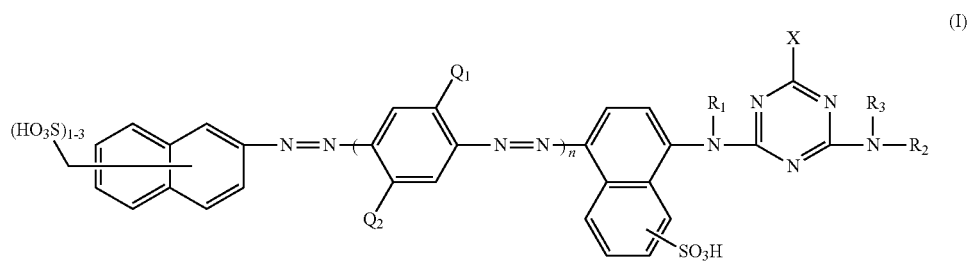

wherein X is a halo or carboxypyridinium; $R_1$, $R_2$ and $R_3$ are independently hydrogen, $C_{1-4}$alkyl, $C_{1-4}$alkylcarbonyl, benzyl, $C_{1-4}$hydroxyalkyl or sulfobenzyl; n is 0 or 1; $Q_1$ and $Q_2$ are independently hydrogen, sulfo, $C_{1-4}$alkyl, $C_{1-4}$alkoxy, $C_{1-4}$alkanoylamino or ureido; and $(HO_3S)_{1-3}$ is 1 to 3 sulfo groups optionally bound to naphthyl.

In one embodiment, n is 0 in the formula (I), and the reactive dye of the present invention has the structure of formula (I-1):

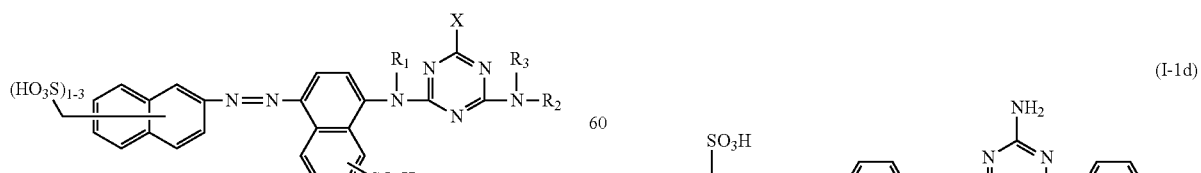

wherein X is a halo or carboxypyridinium; and $R_1$, $R_2$ and $R_3$ are independently hydrogen, $C_{1-4}$alkyl, $C_{1-4}$alkylcarbonyl, benzyl, $C_{1-4}$hydroxyalkyl or sulfobenzyl.

In one embodiment, X is a halo or carboxypyridinium; and $R_1$, $R_2$ and $R_3$ are independently hydrogen, $C_{1-4}$alkyl, $C_{1-4}$hydroxyalkyl or sulfobenzyl. For example, the reactive dye of the present invention has the structure of (I-1a), (I-1b), (I-1c), (I-1d), (I-1e), (I-1f) or (I-1g):

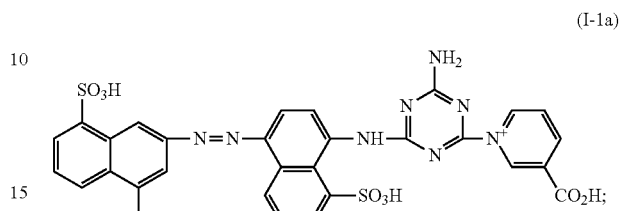

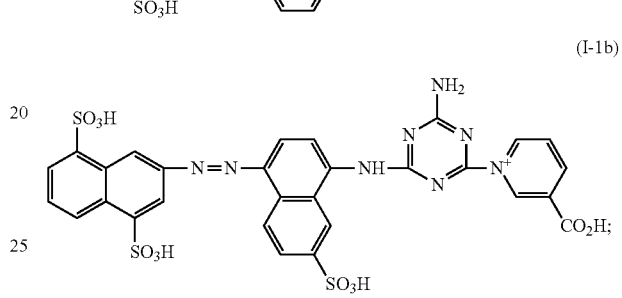

-continued

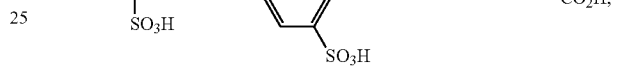

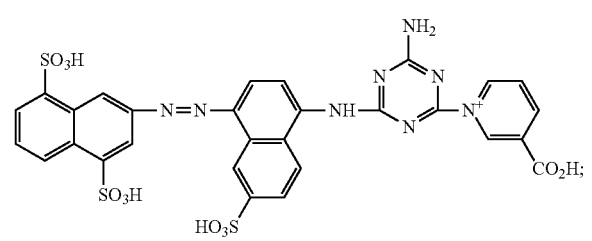

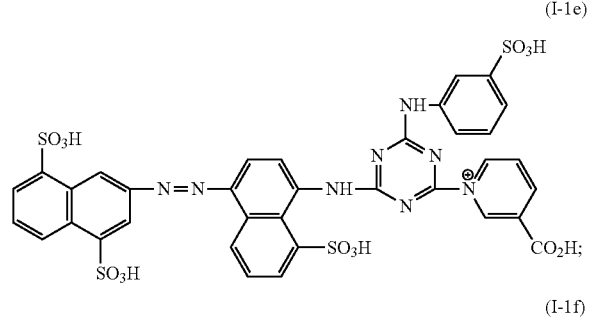

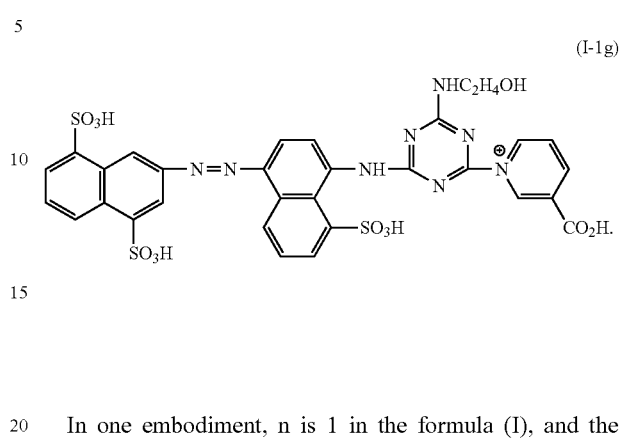

In one embodiment, n is 1 in the formula (I), and the reactive dye of the present invention has the structure of formula (I-2):

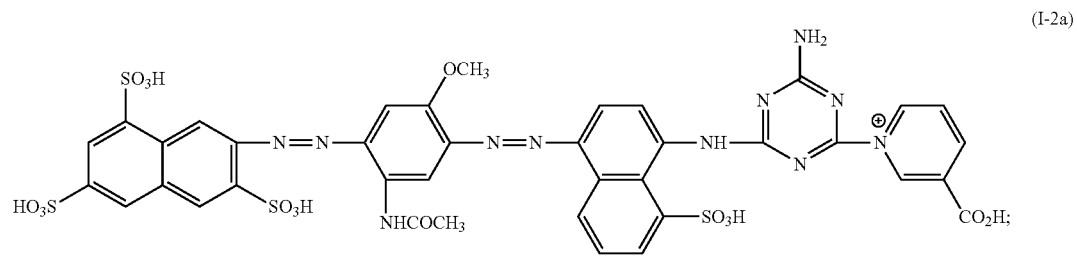

wherein X is a halo or carboxypyridinium; $R_1$, $R_2$ and $R_3$ are independently hydrogen, $C_{1-4}$alkyl, $C_{1-4}$alkylcarbonyl, benzyl, $C_{1-4}$hydroxyalkyl or sulfobenzyl; and $Q_1$ and $Q_2$ are independently hydrogen, $C_{1-4}$alkyl, $C_{1-4}$alkoxy or $C_{1-4}$alkanoylamino.

In the embodiment, X is a halo or carboxypyridinium; $R_1$, $R_2$ and $R_3$ are independently hydrogen, $C_{1-4}$alkyl, benzyl, $C_{1-4}$hydroxyalkyl or sulfobenzyl; and $Q_1$ and $Q_2$ are independently $C_{1-4}$alkoxy or $C_{1-4}$alkanoylamino. For example, the reactive dye of the present invention has the structure of formula (I-2a), (I-2b), (I-2c) or (I-2d):

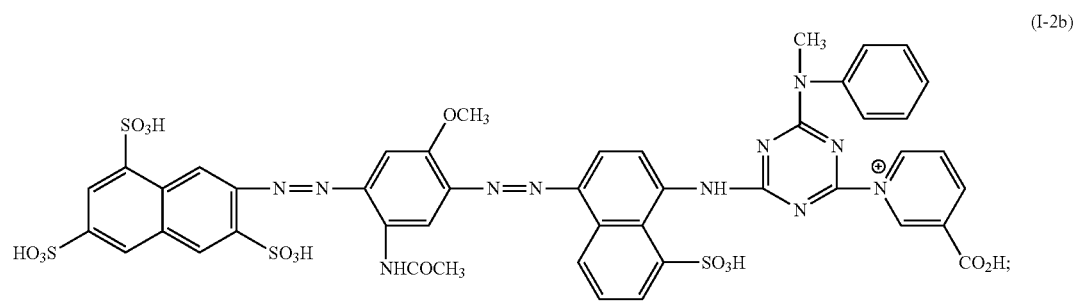

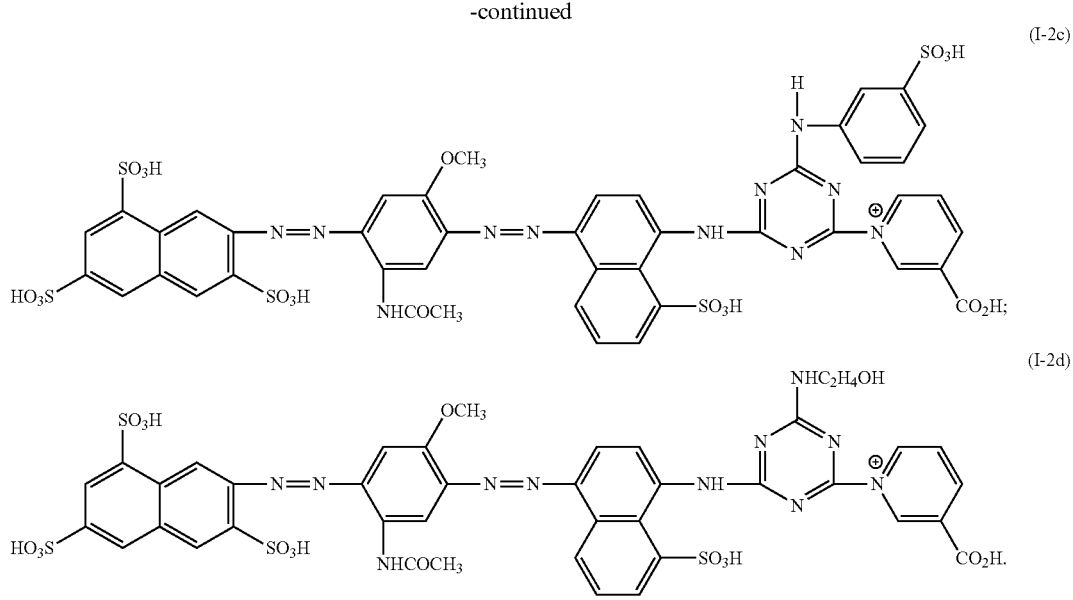

DETAILED DESCRIPTION OF THE PREFERRED EMBODIMENTS

The reactive dye of the present invention has great build-up property. In comparison with the commercial dyes, the reactive dye of the present invention has better build-up property, and has better reproducibility and dyeing fastness in mid-temperature exhausting dyeing and cold pad batch dyeing.

The following specific examples are used for illustrating the present invention. A person skilled in the art can easily conceive the other advantages and effects of the present invention.

For illustration, all compounds in the specification are presented as free acids; however, the reactive dye of the present invention would be in the form of water-soluble salts, wherein the salts may be alkali metals, alkaline earth metals, ammonium salts or organic amines, and preferably sodium salts, potassium salts, lithium salts, ammonium salts or triethanolamine salts.

The reactive dyes of the present invention can be prepared by the conventional methods, and there is no limitation to the order of the steps. The chromophore can be prepared, and then the dye can be synthesized. Alternatively, the chromophore can be synthesized during the preparation of the dye.

The reactive dye of the present invention can be applicable to fiber materials, especially cellulose fiber materials, and applicable for dyeing or printing of fiber materials having the cellulose fiber. The fiber materials can be, but not limited to, natural or regenerated cellulose fibers such as cotton, hemp, flax, ramie, viscose rayon or fiber materials having cellulose fibers. The reactive dye of the present invention can be also applicable for dyeing and printing of fiber blends having hydroxycellulose fibers.

The reactive dye of the present invention can be fixed on fibers in aqueous dye solution and printing paste, and can be used for dyeing and printing in exhausting dyeing, continuous dyeing, cold pad batch dyeing, printing or digital printing.

In the present invention, the dyeing or printing can be performed according to the conventional methods. For example, exhaustion dyeing is performed by using inorganic neutral salts (such as anhydride sodium sulfate and sodium chloride) and/or the well-known acid binding agents (such as sodium carbonate and sodium hydroxide). The amounts of the inorganic neutral salts and alkali are not critical, and may be added together or separately into the dye bath. In addition, dyeing auxiliary agents (such as dye leveling agents and dye retarding agents) can be used, and the temperature for dyeing can be in the range from 40° C. to 90° C., and preferably from 50° C. to 70° C.

In cold pad batch dyeing, the object to be dyed is rolled and dyed with the inorganic neutral salt (such as anhydride sodium sulfate or sodium chloride) and the acid binding agent (such as sodium carbonate or sodium hydroxide) at the room temperature.

In continuous dyeing, the object to be dyed is placed in the dye solution mixed with the acid binding agent (such as sodium carbonate or sodium bicarbonate), and then dried by heat or fixed by vapor. In two-bath dyeing, the object is dyed, treated with the inorganic neutral salt (such as sodium sulfate or sodium silicate), and then dried or fixed by vapor.

The present invention is illustrated by, but not limited to, the following embodiments. The temperature is presented as Celsius degree, and parts and percentage are calculated based on weight without specified.

Embodiment 1

(1) 30.2 parts of 2-naphthylamine-4,8-disulfonic acid were dispersed in 300 parts of ice water, and then added with 28.5 parts of 32% HCl solution. The mixture was stirred, and then slowly added with 6.9 parts of sodium nitrite solution. The mixture was stirred for 1 hour at 0-5° C. Then, the mixture was slowly added with 22.3 parts of 1-naphthylamine-8-sulfonic acid, and then the pH was adjusted to 3 with sodium bicarbonate. The mixture was stirred for 3 hours at 10-15° C. The reaction solution was then formed.

(2) 100 parts of ice water including 18.4 parts of cyanuric chloride was slowly poured into the reaction solution, and the pH of the solution was adjusted to 5-6 by sodium bicarbonate. The mixture was stirred at 10-15° C. for three hours, and then filtered to obtain the reaction solution.

(3) The pH of the reaction solution was adjusted to 10-11 by 24% ammonia solution. The mixture was heated to 40-45° C., stirred for 2 hours, and then processed via salting out to obtain the product (1).

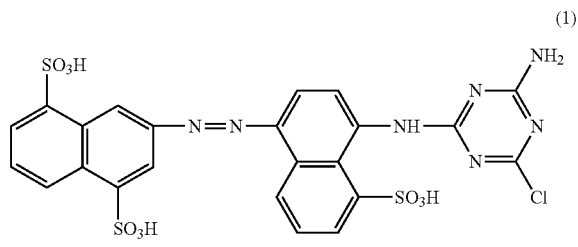 [SMILES: Nc1nc(Cl)nc(Nc2ccc(N=Nc3cc(S(=O)(=O)O)c4cccc(S(=O)(=O)O)c4c3)c3cccc(S(=O)(=O)O)c23)n1]

(1)

(4) The product (1) was dispersed in 300 parts of water, and then added with 12.3 parts of pyridine-3-carboxylic acid. The mixture was heated to 70-80° C., stirred for 3 hours, and then processed via salting out to obtain the product (2), i.e. the compound of formula (I-1a) (λmax=405 nm)

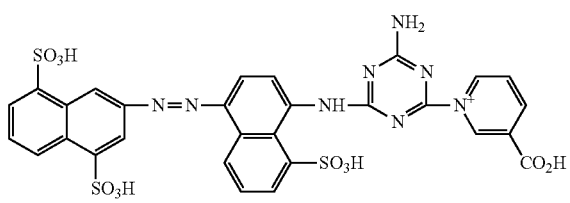

(2)

Embodiment 2

(1) 30.2 parts of 2-naphthylamine-4,8-disulfonic acid were dispersed in 300 parts of ice water, added with 28.5 parts of 32% HCl solution, stirred and then added with 6.9 parts of sodium nitrite solution. The mixture was stirred for 1 hour at 0-5° C. Then, the mixture was slowly added with 22.3 parts of 1-naphthylamine-7-sulfonic acid. Then, the pH of the mixture was adjusted to 3 by sodium bicarbonate, and stirred at 10-15° C. for 3 hours, so as to obtain the reaction solution.

(2) 100 parts of ice water including 18.4 parts of cyanuric chloride was slowly poured into the reaction solution, and the pH of the solution was adjusted to 5-6 by sodium bicarbonate. The mixture was stirred at 10-15° C. for 2 hours, and then filtered to obtain the reaction solution.

(3) The pH of the reaction solution was adjusted to 10-11 by 24% ammonia solution. The mixture was heated to 40-45° C., stirred for 2 hours, and then processed via salting out to obtain the product (3).

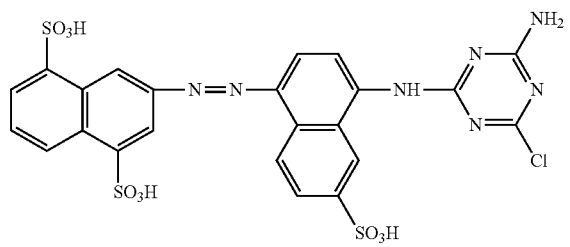

(3)

(4) The product (3) was dispersed in 300 parts of water, and then added with 12.3 parts of pyridine-3-carboxylic acid. The mixture was heated to 70-80° C., stirred for 3 hours, and then processed via salting out to obtain the product (4), i.e. the compound of formula (I-1b) (λmax=400 nm)

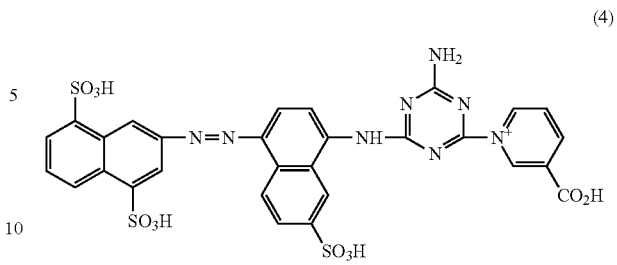

(4)

Embodiment 3

(1) 30.2 parts of 2-naphthylamine-4,8-disulfonic acid were dispersed in 300 parts of ice water, added with 28.5 parts of 32% HCl solution, stirred and then added with 6.9 parts of sodium nitrite solution. The mixture was stirred for 1 hour at 0-5° C. Then, the mixture was slowly added with 22.3 parts of 1-naphthylamine-6-sulfonic acid. Then, the pH of the mixture was adjusted to 3 by sodium bicarbonate, and stirred at 10-15° C. for 3 hours, so as to obtain the reaction solution.

(2) 100 parts of ice water including 18.4 parts of cyanuric chloride was slowly poured into the reaction solution, and the pH of the solution was adjusted to 5-6 by sodium bicarbonate. The mixture was stirred at 10-15° C. for 2 hours, and then filtered to obtain the reaction solution.

(3) The pH of the reaction solution was adjusted to 10-11 by 24% ammonia solution. The mixture was heated to 40-45° C., stirred for 2 hours, and then processed via salting out to obtain the product (5).

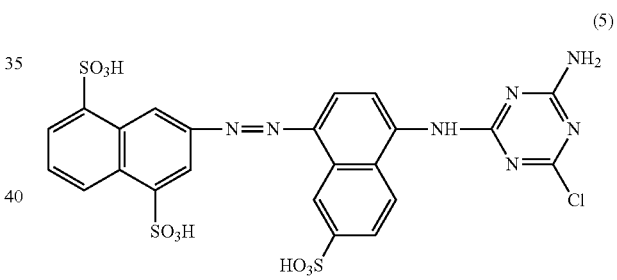

(5)

(4) The product (5) was dispersed in 300 parts of water, and then added with 12.3 parts of pyridine-3-carboxylic acid. The mixture was heated to 70-80° C., stirred for 3 hours, and then processed via salting out to obtain the product (6), i.e. the compound of formula (I-1c) (λmax=400 nm)

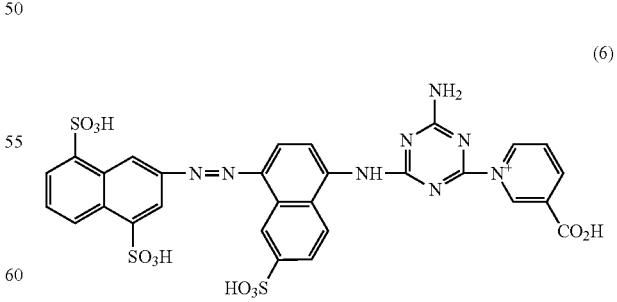

(6)

Embodiment 4

(1) 30.2 parts of 2-naphthylamine-1,5-disulfonic acid were dispersed in 300 parts of ice water, added with 28.5 parts of 32% HCl solution, stirred and then added with 6.9 parts of sodium nitrite solution. The mixture was stirred for 1 hour at 0-5° C. Then, the mixture was slowly added with 22.3 parts of 1-naphthylamine-8-sulfonic acid. Then, the pH of the mixture was adjusted to 6 by sodium bicarbonate, and stirred at 10-15° C. for 3 hours, so as to obtain the reaction solution.

(2) 100 parts of ice water including 18.4 parts of cyanuric chloride was slowly poured into the reaction solution, and the pH of the solution was adjusted to 9-9.5 by sodium bicarbonate. The mixture was stirred at 8-10° C. for 3 hours, and then filtered to obtain the reaction solution.

(3) The pH of the reaction solution was adjusted to 10-11 by 24% ammonia solution. The mixture was heated to 40-45° C., stirred for 2 hours, and then processed via salting out to obtain the product (7).

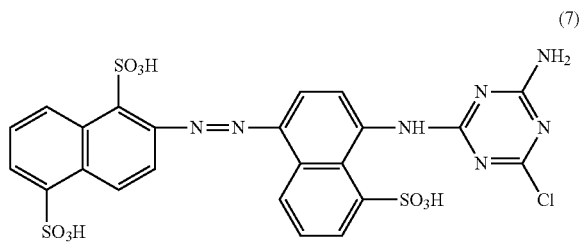 [SMILES: Nc1nc(Cl)nc(Nc2ccc(N=Nc3ccc4c(S(=O)(=O)O)cccc4c3S(=O)(=O)O)c3cccc(S(=O)(=O)O)c23)n1]

(7)

(4) The product (7) was dispersed in 300 parts of water, and then added with 12.3 parts of pyridine-3-carboxylic acid. The mixture was heated to 70-80° C., stirred for 2 hours, and then processed via salting out to obtain the yellow product (8), i.e. the compound of formula (I-1d) ($\lambda$max=400 nm)

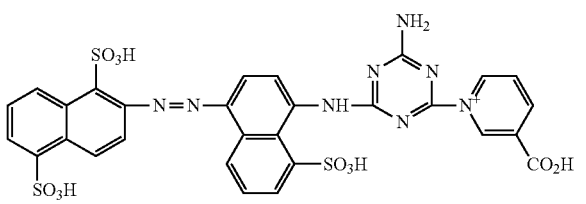

(8)

Embodiments 5 to 7

The following reactive dyes of pyridine-3-carboxylic acid were prepared according to Embodiments 1 to 4. The dyes had high purity, great build-up property and great fastness.

Embodiment 5

The yellow product (9), i.e. compound of formula (I-1e) ($\lambda$max=402 nm) was obtained.

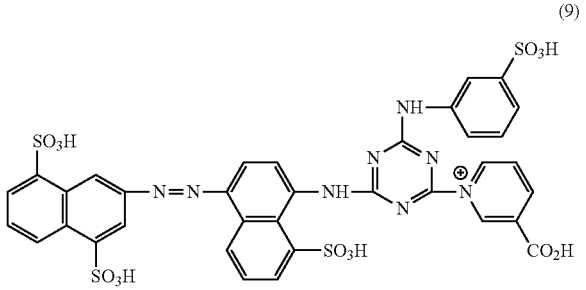 [SMILES: O=C(O)c1ccc[n+](-c2nc(Nc3cccc(S(=O)(=O)O)c3)nc(Nc3ccc(N=Nc4cc(S(=O)(=O)O)c5cccc(S(=O)(=O)O)c5c4)c4cccc(S(=O)(=O)O)c34)n2)c1]

(9)

Embodiment 6

The yellow product (10), i.e. compound of formula (I-1f) ($\lambda$max=408 nm) was obtained.

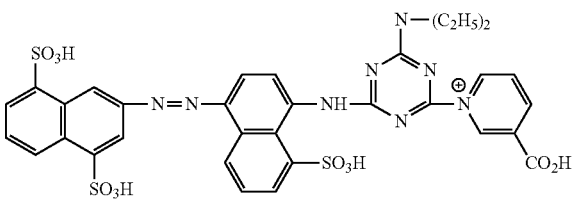

(10)

Embodiment 7

The yellow product (11), i.e. compound of formula (I-1g) ($\lambda$max=406 nm) was obtained.

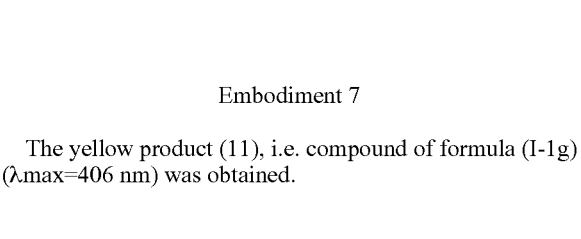

(11)

Embodiment 8

(1) 57.5 parts of 2-naphthylamine-3,6,8-trisulfonic acid were dispersed in 225 parts of ice water, and added with 45 parts of sodium nitrite solution. The mixture was stirred at 8-15° C. for 1 hour. The mixture was added with 27.03 parts of 3-amino-4-methoxyacetanilide. The pH of the mixture was adjusted to 5-5.5 by 45% sodium hydroxide solution, and the mixture was stirred at 20° C. for 2 hours. The mixture was added with 36.87 parts of 32% HCl solution, and slowly added with 45 parts of sodium nitrite solution. The mixture was stirred at 5 to 10° C. for 1 hour. The mixture was added with 32.82 parts of 1-naphthylamine-8-sulfonic acid. The mixture was added with diazo solution at 10-15° C., the pH of the mixture was maintained at 6-6.5 by 45% sodium hydroxide solution, stirred for 2 hours, and the mixture was processed via salting out to obtain the product (12).

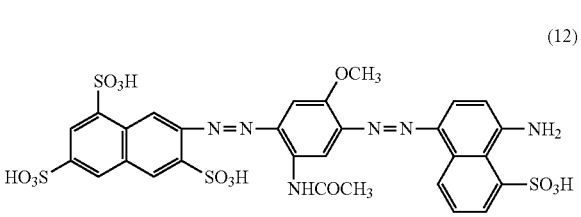

(12)

(2) 24.91 parts of cyanuric chloride were dispersed in 40 parts of ice water. The mixture was added to the solution of the product (12) at 0-5° C., and then the pH of the mixture was maintained at 6-7 by 15% sodium carbonate solution. The mixture was stirred at 10-15° C. for 1 hour.

(3) 16.55 parts of 24% ammonia solution were added to the reaction solution obtained from the above step (2), and the mixture was stirred at 40-45° C. for 1 hour. Then, 28.25 parts of pyridine-3-carboxylic acid were added to the mixture. The mixture was heated to 80-90° C., and stirred for 5 hours, so as to obtain the red brown product (13), i.e. the compound of formula (I-2a). ($\lambda$max=481 nm)

Embodiment 10

(1) 24.91 parts of cyanuric chloride were dispersed in 40 parts of ice water. The mixture was added to the solution of the product (12) at 0-5° C., and then the pH of the mixture was maintained at 6-7 by 15% sodium carbonate solution. The mixture was stirred at 10-15° C. for 1 hour.

(2) 23.86 parts of metallic acid were added to the reaction solution formed from the above step (1), and the mixture was stirred at 40-45° C. for 1 hour. Then, 28.25 parts of pyridine-3-carboxylic acid were added. The mixture was heated to 80-90° C., and stirred for 5 hours. Then, the red brown product (15), i.e. the compound of formula (I-2c), was obtained. ($\lambda$max=520 nm)

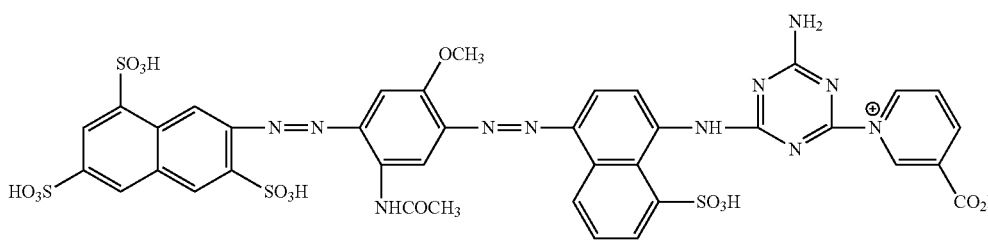

(13)

Embodiment 9

(1) 24.91 parts of cyanuric chloride were dispersed in 40 parts of ice water. The mixture was added to the solution of the product (12) at 0-5° C., and then the pH of the mixture was maintained at 6-7 by 15% sodium carbonate solution. The mixture was stirred at 10-15° C. for 1 hour.

(2) 14.77 parts of N-methyl aniline were added to the reaction solution formed from the above step (1), and the mixture was stirred at 40-45° C. for 1 hour. Then, 28.25 parts of pyridine-3-carboxylic acid were added. The mixture was heated to 80-90° C., and stirred for 5 hours. Then, the red brown product (14), i.e. the compound of formula (I-2b), was obtained. ($\lambda$max=520 nm)

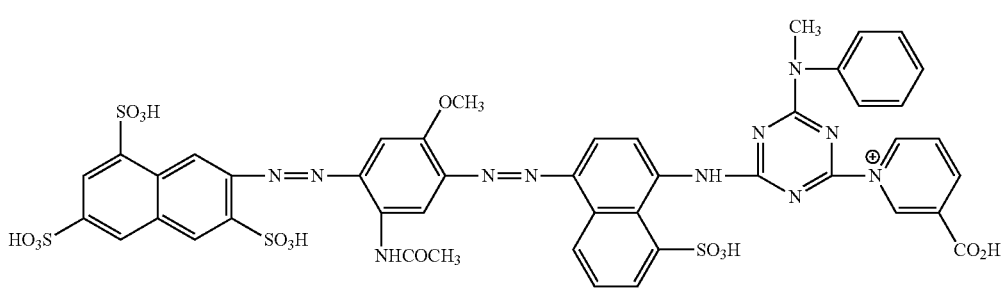

(14)

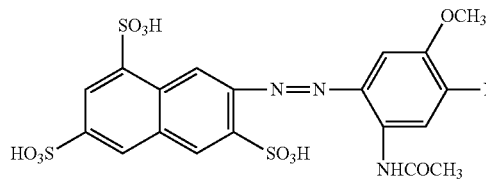
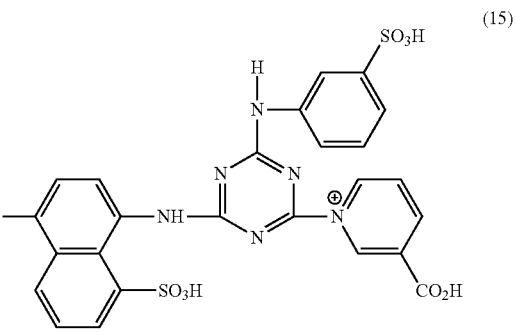

(15)

Embodiment 11

(1) 24.91 parts of cyanuric chloride were dispersed in 40 parts of ice water. The mixture was added to the solution of the product (12) at 0-5° C., and then the pH of the mixture was maintained at 6-7 by 15% sodium carbonate solution. The mixture was stirred at 10-15° C. for 1 hour.

(2) 8.42 parts of ethanolamine were added to the reaction solution formed from the above step (1), and the mixture was stirred at 40-45° C. for 1 hour. Then, 28.25 parts of pyridine-3-carboxylic acid were added. The mixture was heated to 80-90° C., and stirred for 5 hours. Then, the red brown product (16), i.e. the compound of formula (I-2d), was obtained. (λmax=530 nm)

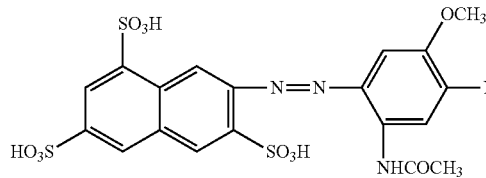
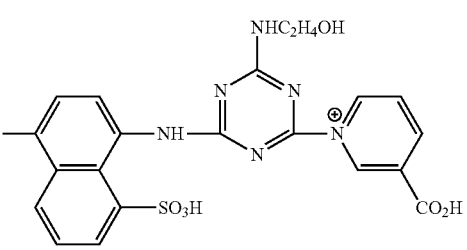

(16)

Test Example 1

1 part of the dye obtained from Embodiment 8 was completely dissolved in 100 parts of distilled water to form the dye solution. 20 parts of the dye solution were introduced in the dye ring, added with 4.8 parts of mirabilite, and added with distilled water to total 75 parts. Then, the mixture was added with 5 parts of pure alkali solution (320 g/L). 4 parts of cotton fabrics of plain weave were placed into the dye solution, and well mixed with the dye. Then, the dye ring was placed in the incubator, the temperature was raised to 60° C. in 30 minutes, and fixation was performed for 60 minutes. After dyeing, the fabrics were cleaned with cold water, then cleaned, decolored, and dried. The red brown dyed fabrics had great deep dying property and dye uptake.

The measurement of build-up property: K/S value indicated color depth or appearance color depth of the fabrics. The measurement was determined according to the reflection rate of the fabrics. The reflection rate (R) of the covered part and uncovered part of the fabrics was measured by spectrophotometer, and calculated into the K/S value according to the equation:

$$K/S=(1-R)^2/2R$$

Test Example 2

3 parts of the dye prepared from Embodiment 1 were dissolved in 100 ml of water to form the pad dyeing solution (30 parts/L). 25 ml of the alkali agent (sodium hydroxide (15 ml/L) and mirabilite (30 parts/L)) was added in the pad dyeing solution, and the mixture was stirred. The mixture was poured into the Roller pad dyeing device. After being dyed, the cotton fabrics were rolled. Then, the rolled cotton fabrics were stored at room temperature for 4 hours. Then, the yellow fabrics were cleaned with cold water, then cleaned with boiled water for 10 minutes, cleaned with boiled non-ionic detergent for 10 minutes, and cleaned with cold water. Then, the fabrics were dried, and the yellow fabrics were then obtained. The yellow fabrics had great build-up property and color uptake.

Test Example 3 Comparison of Build-Up Property in Exhausting Dyeing

The dye prepared from Embodiment 1 and the dye of Comparative Example were compared according to the method of Test Example 1, wherein different concentrations of the dye solution were used for the comparison of build-up property in exhausting dyeing. The results were shown in Table 1.

TABLE 1

| Dye (o.w.f) | Build-up property in exhausting dyeing (K/S) | | | |
|---|---|---|---|---|
| | 1% | 2% | 4% | 8% |
| Dye of Embodiment 1 | 5.30 | 9.49 | 16.33 | 21.61 |
| Dye of Comparative Example 1 | 3.15 | 6.32 | 12.48 | 18.90 |

Comparative Example 1:

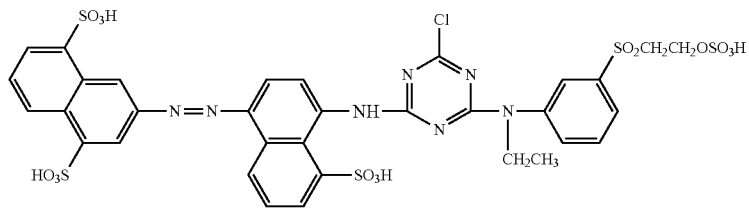

According to the present invention, the dye of Embodiment 1 had great build-up property in mid-temperature exhausting dyeing.

Test Example 4 Comparison of Build-Up Property in Cold Pad Batch Dyeing

The dye of Embodiment 8 and the dye of Comparative Example 2 were compared according to the method of Comparative Example 2, wherein different concentrations of dye solution (g/l) were used for the comparison of build-up property. The results were shown in Table 2.

TABLE 2

| Dye | K/S (cold pad batch dyeing 16 hours) | | |
|---|---|---|---|
| | 15 g/l | 30 g/l | 60 g/l |
| Dye of Embodiment 8 | 8.134 | 11.323 | 13.030 |
| Dye of Comparative Example | 25.185 | 8.000 | 9.820 |

Comparative Example 2:

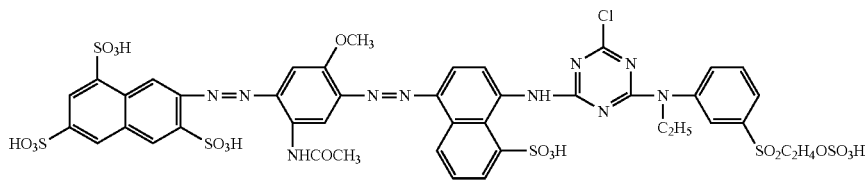

According to the present invention, the dye of Embodiment 8 had great build-up property in cold pad batch dyeing.

In comparison with the dyes of Comparative Examples 1 and 2, the reactive dye of the present invention has better build-up property and reproducibility in mid-temperature dyeing and cold pad batch dyeing. In comparison with the commercial dyes, the reactive dye of the present invention has great build-up property, water cleaning property and fastness.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

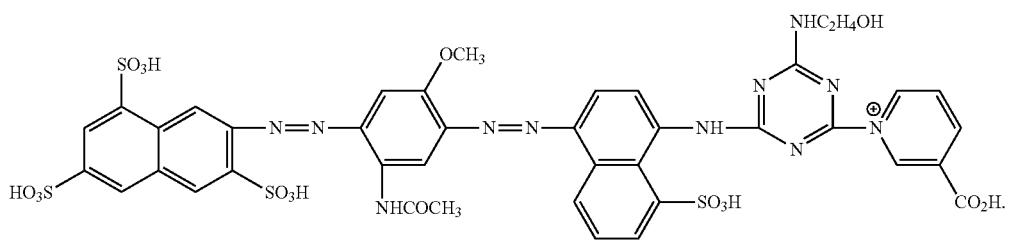

What is claimed is:
1. A reactive dye of a structure of formula (I):

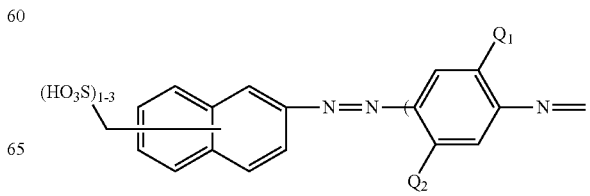

-continued

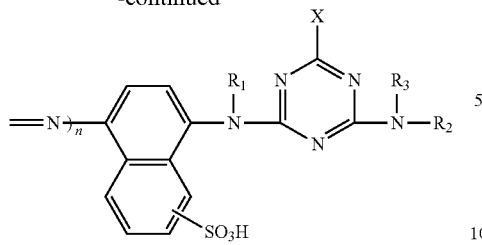

wherein X is carboxypyridinium; $R_1$, $R_2$ and $R_3$ are independently hydrogen, $C_{1-4}$alkyl, $C_{1-4}$alkylcarbonyl, benzyl, $C_{1-4}$hydroxyalkyl or sulfobenzyl; n is 0 or 1; $Q_1$ and $Q_2$ are independently hydrogen, sulfo, $C_{1-4}$alkyl, $C_{1-4}$alkoxy, $C_{1-4}$alkanoylamino or ureido; and $(HO_3S)_{1-3}$ is 1 to 3 sulfo groups.

2. The reactive dye of claim 1, wherein when n is 0, X is carboxypyridinium, and $R_1$, $R_2$ and $R_3$ are independently hydrogen, $C_{1-4}$alkyl, $C_{1-4}$alkylcarbonyl, benzyl, $C_{1-4}$hydroxyalkyl or sulfobenzyl.

3. The reactive dye of claim 2, wherein X is carboxypyridinium, and $R_1$, $R_2$ and $R_3$ are independently hydrogen, $C_{1-4}$alkyl, $C_{1-4}$hydroxyalkyl or sulfobenzyl.

4. The reactive dye of claim 3, which is:

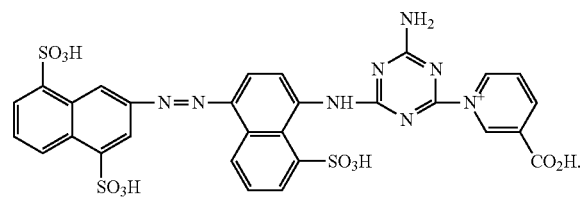

5. The reactive dye of claim 3, which is:

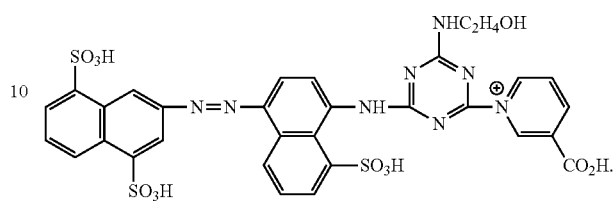

6. The reactive dye of claim 1, wherein when n is 1, X is carboxypyridinium, $R_1$, $R_2$ and $R_3$ are independently hydrogen, $C_{1-4}$alkyl, $C_{1-4}$alkylcarbonyl, benzyl, $C_{1-4}$hydroxyalkyl or sulfobenzyl, and $Q_1$ and $Q_2$ are independently hydrogen, $C_{1-4}$alkyl, $C_{1-4}$alkoxy, or $C_{1-4}$alkanoylamino.

7. The reactive dye of claim 6, wherein X is carboxypyridinium, $R_1$, $R_2$ and $R_3$ are independently hydrogen, $C_{1-4}$alkyl, benzyl, $C_{1-4}$hydroxyalkyl or sulfobenzyl, and $Q_1$ and $Q_2$ are independently $C_{1-4}$alkoxy, or $C_{1-4}$alkanoylamino.

8. The reactive dye of claim 7, which is:

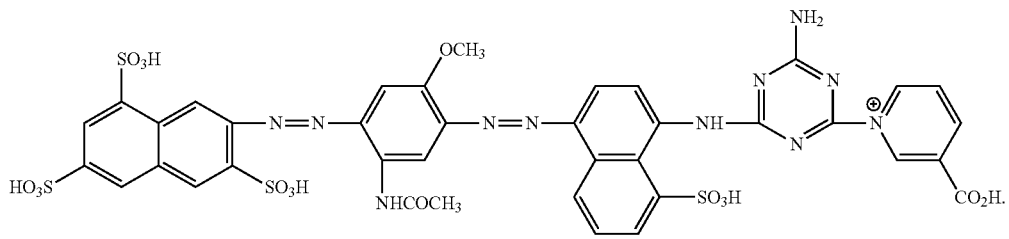

9. The reactive dye of claim 7, which is: